US012593377B2

(12) United States Patent
Kielmann et al.

(10) Patent No.: US 12,593,377 B2
(45) Date of Patent: Mar. 31, 2026

(54) METHOD FOR LOAD DETECTION IN A COOKING CHAMBER OF A COOKING DEVICE AND COOKING DEVICE

(71) Applicant: Topinox Sarl, Wittenheim (FR)

(72) Inventors: Felix Kielmann, Wittenheim (FR); Christian Koenen, Wittenheim (FR); Phillip Van Halsema, Wittenheim (FR)

(73) Assignee: TOPINOX SARL, Wittenheim (FR)

( * ) Notice: Subject to any disclaimer, the term of this patent is extended or adjusted under 35 U.S.C. 154(b) by 910 days.

(21) Appl. No.: 17/881,383

(22) Filed: Aug. 4, 2022

(65) Prior Publication Data

US 2023/0039001 A1 Feb. 9, 2023

(30) Foreign Application Priority Data

Aug. 4, 2021 (DE) ..................... 10 2021 120 310.4

(51) Int. Cl.
*H05B 6/64* (2006.01)
*H05B 6/68* (2006.01)

(52) U.S. Cl.
CPC ........... *H05B 6/645* (2013.01); *H05B 6/6458* (2013.01)

(58) Field of Classification Search
CPC .............................. H05B 6/645; H05B 6/6458
USPC ........ 219/704, 702, 679, 680, 681.682, 705, 219/708, 709, 710, 711, 712, 713, 719, 219/761, 762, 763
See application file for complete search history.

(56) References Cited

U.S. PATENT DOCUMENTS 5,378,875 A * 1/1995 Hirama .................. H05B 6/645 219/709
5,919,389 A * 7/1999 Uehashi ............... H05B 6/6464 219/719
2022/0283135 A1 9/2022 Nelson et al. ......... G01N 33/02

FOREIGN PATENT DOCUMENTS

| | | | |
|---|---|---|---|
| DE | 102004015993 | 11/2005 | ............... H05B 1/02 |
| DE | 102016108542 | 11/2017 | ............... H05B 6/68 |
| DE | 102018121241 | 3/2020 | ................ F24C 7/08 |
| DE | 102019101695 | 7/2020 | ................ F24C 7/08 |
| DE | 102019119075 | 1/2021 | ................ F24C 7/08 |
| DE | 102020104743 | 8/2021 | ................ F24C 7/08 |

* cited by examiner

*Primary Examiner* — Quang T Van
(74) *Attorney, Agent, or Firm* — HAYES SOLOWAY P.C.

(57) ABSTRACT

A method for load detection in a cooking chamber of a cooking device is described. At least one cooking chamber climate value in the cooking chamber is acquired. A gradient of a temperature change is acquired using a temperature sensor associated with a microwave trap or a microwave absorber. The at least one cooking chamber climate value and the gradient of the temperature change are evaluated jointly to estimate the load in the cooking chamber of the cooking device. Furthermore, a cooking device for cooking food to be cooked is described.

12 Claims, 2 Drawing Sheets

METHOD FOR LOAD DETECTION IN A COOKING CHAMBER OF A COOKING DEVICE AND COOKING DEVICE

FIELD OF THE DISCLOSURE

Embodiments of the present disclosure relate to a method for load detection in a cooking chamber of a cooking device. Furthermore, embodiments of the present disclosure relate to a cooking device.

BACKGROUND

In modern cooking devices used in professional or canteen kitchens, a microwave source which serves as a heating source to cook a food to be cooked placed in the cooking chamber can be used in addition to a heating device for generating hot air and a steam device for generating steam. In principle, the heating device and the steam device can be used to set a cooking chamber atmosphere in the cooking chamber of the cooking device, which is also referred to as cooking chamber climate. The food to be cooked in the cooking chamber is thereby exposed to the cooking chamber atmosphere or the cooking chamber climate, as a result of which the food to be cooked is cooked accordingly. In addition to these conventional devices for setting the cooking chamber climate, the microwave source serves in particular to accelerate the cooking process of the food to be cooked by (additionally) introducing energy into the food to be cooked via microwaves.

To make optimal use of the potential of the microwave source when cooking the food to be cooked, it is necessary to control the microwave source with respect to the load present in the cooking chamber, the amount of food to be cooked present in the cooking chamber, or the type of food to be cooked present. A cooking accessory present in the cooking chamber may also have a corresponding influence. Consequently, a cooking accessory and/or food to be cooked may be the (dielectric) load from the point of view of the microwave source. In this respect, it is important that the load present in the cooking chamber is detected as accurately as possible to improve the control of the microwave source and overall of the entire cooking process. In addition, the detection of the load should be as fast as possible so that the control can take place at the beginning of the cooking process. This is particularly important for very short cooking processes.

Currently, load detection in the cooking device is performed via the heating device by determining the heat loss in the cooking chamber at a set heating power. However, this process takes up to two minutes, which is why it is not suitable for very short cooking processes. In addition, the load present in the cooking chamber can only be classified very roughly. In this respect, the load detection known from the prior art or the associated method is unsuitable for short cooking processes.

The object is to realize a fast load detection which is as exact as possible in a cooking device.

SUMMARY

The object is achieved by a method for load detection in a cooking chamber of a cooking device, the method comprising the following steps:

- acquiring at least one cooking chamber climate value in the cooking chamber,
- acquiring a gradient of a temperature change by means of a temperature sensor associated with a microwave trap or a microwave absorber,
- jointly evaluating the at least one cooking chamber climate value and the gradient of the temperature change to estimate the load in the cooking chamber of the cooking device.

The basic idea is to fuse two different pieces of information obtained via different, in particular independent, sensors of the cooking device, i.e. to provide a sensor data fusion and to use it in the evaluation. For this purpose, in addition to the cooking chamber climate value, which is acquired by a conventional sensor associated with the cooking chamber, for example, the gradient of the temperature change of the temperature sensor associated with the microwave trap or the microwave absorber is also acquired, and the two data are evaluated together. The cooking chamber climate value may be a temperature value of the cooking chamber, also referred to as cooking chamber temperature, and/or a humidity value of the cooking chamber, as both the temperature and the humidity define the cooking chamber climate. The conventional sensor which is arranged to acquire the cooking chamber climate value is therefore also referred to as a climate sensor.

The temperature sensor associated with the microwave trap or the microwave absorber is basically arranged to detect a temperature of at least a section of the microwave trap or the microwave absorber. This makes it possible to determine the microwave energy (density) in the cooking chamber accordingly by detecting the temperature change of the section of the microwave trap or the microwave absorber via the temperature sensor. The information derived therefrom about the microwave energy (density) present in the cooking chamber is evaluated together with the at least one acquired cooking chamber value to enable the most accurate possible estimation of the load present in the cooking chamber of the cooking device.

It may be provided that the temporal course of the temperature change of the microwave trap or the microwave absorber is detected by the associated temperature sensor, as a result of which the quality of the cooking chamber or the dielectric load present in the cooking chamber can be concluded. The quality of the cooking chamber depends on the dielectric load present in the cooking chamber, i.e. the quantity and/or type of food to be cooked or cooking accessories present in the cooking chamber.

The microwave source introduces microwaves into the cooking chamber, causing an electro-magnetic field to form in the cooking chamber as a function of the dielectric load present in the cooking chamber. The electric field present in the cooking chamber results in an electric field in the microwave trap, which is proportional in terms of intensity to the electric field in the cooking chamber. The electric field in turn results in dielectric as well as ohmic losses, the magnitude of the dielectric or ohmic losses depending on the strength of the electric field in the microwave trap, so that the dielectric or ohmic losses are proportional to the electric field in the cooking chamber. Therefore, the dielectric load in the cooking chamber can be inferred from the temperature change in the microwave trap, which is detected accordingly by the temperature sensor.

Basically, both mechanisms, i.e. the dielectric losses and the ohmic losses, within the microwave trap thus lead to a temperature increase in the area of the microwave trap, which is detected by the associated temperature sensor. Therefore, it is possible to use the temperature (change) of the microwave trap to (indirectly) infer the electric field present in the cooking chamber and thus the dielectric load present in the cooking chamber, as the latter affects the electric field accordingly.

As already explained, this information is used together with the information of the cooking chamber climate value, which is additionally acquired by a separate sensor, and these are evaluated jointly to estimate as accurately as possible the (dielectric) load present in the cooking chamber of the cooking device.

Microwave traps are basically known assemblies which are configured, for example, as so-called λ/4-traps. The microwave traps thus have an electrical length which is dependent on the wavelength and results in a standing wave within the geometry. The microwave resonates within the geometry, resulting in field rises and thus maximizing losses.

Microwave traps are generally used to prevent electromagnetic waves, i.e. microwaves, from passing through the microwave trap. For this purpose, the microwave traps typically have an open side via which the electromagnetic waves can enter the microwave traps, and a side opposite to the open side, also referred to as the bottom of the microwave trap.

For example, the microwave trap is in resonance with the electromagnetic waves, so that a short circuit is created in the area of the microwave trap, which results in a reflection of the electromagnetic waves, preventing them from passing through the microwave trap. In fact, it is achieved that the electromagnetic waves are reflected at or in the microwave trap, so that the electromagnetic waves entering the microwave trap cannot pass through the microwave trap or continue to travel in the direction of incidence.

This results in the dielectric or ohmic losses, which are converted into thermal energy, which can be detected by the temperature sensor associated with the microwave trap.

Thus, a microwave trap corresponds to a form or structure resonant for the microwave.

The ohmic losses are in particular produced in the area of the bottom of the microwave trap, namely due to a short-circuit current.

In contrast thereto, the microwave absorber is a component which absorbs microwaves (electromagnetic radiation), as a result of which the microwave absorber heats up, which can be detected accordingly by means of the associated temperature sensor.

As already explained above, it is also provided that in addition to the temperature change, in particular the gradient of the temperature change, the cooking chamber climate value acquired by means of a further sensor is additionally used to estimate the load in the cooking chamber of the cooking device therefrom.

In this respect, early detection of the load in the cooking chamber is possible, for example of the load quantity. In this respect, the load present in the cooking chamber can be divided or classified into different load groups, for example one rack, three racks or six racks. In principle, the different load groups may each have a gradation in the order of magnitude of one rack, so that the load, in particular the quantity present in the cooking chamber can be estimated per occupied rack level, i.e. in a "rack level accurate" manner.

The additional information obtained and evaluated via the cooking chamber climate value of the cooking chamber, for example the cooking chamber temperature and/or the cooking chamber humidity, ensures that misinterpretations can be ruled out which could occur in the course of a simple evaluation by means of the temperature sensor associated with the microwave trap or the microwave absorber. The information gain due to the additional sensor data thus represents a kind of plausibility check, wherein the data are not evaluated separately from each other or in two stages, as is usually the case with a plausibility check, but jointly.

For example, a temperature change in the area of the microwave trap or the microwave absorber, which is detected by the associated temperature sensor, depends not only on the microwaves fed in, i.e. the energy (density) thereof, but also on the cooking chamber climate in the cooking chamber. Therefore, the cooking chamber climate is additionally taken into account in the load detection to obtain additional information used in the joint evaluation, so that the load detection is carried out as accurate as possible.

The temperature change detected by the temperature sensor associated with the microwave trap or the microwave absorber may also be partially noisy, which may be due, among other things, to the fact that different starting temperatures of the cooking device, different loading times and/or different starting temperatures of the respective food to be cooked and/or cooking accessories are present, which have an influence on the temperature change. This may in fact cause the microwave trap or the microwave absorber to cool down before the microwaves start, i.e. before the associated microwave source is switched on, resulting in a negative gradient of the temperature change. As a result, the (dielectric) load present in the cooking chamber would be overestimated, as a correspondingly smaller slope, i.e., a correspondingly smaller gradient, would be assigned to a low electric field strength in the cooking chamber. In this respect, an incorrect load detection in the cooking chamber would result, as the detected temperature change occurred not due to the load in the cooking chamber, but due to the cooking chamber climate. However, owing to the additional consideration of the cooking chamber climate value, this can be determined and taken into account accordingly during the joint evaluation, as a result of which such a misinterpretation is ruled out.

The assembly comprising the microwave trap or the microwave absorber and the temperature sensor associated with the microwave trap or the microwave absorber may in principle also be referred to as a microwave load sensor or high-frequency sensor.

The microwave load sensor is arranged to estimate the dielectric load in the cooking chamber based on the electric field present in the cooking chamber. However, as described above, this estimation is subject to error in certain situations, which is why the information provided by the microwave load sensor is fused with the cooking chamber climate value so that a joint evaluation is performed.

One aspect provides that the joint evaluation is performed during a period of time in which the information provided by the temperature sensor associated with the microwave trap or the microwave absorber and the information provided by the cooking chamber climate value are decorrelated, i.e., independent of each other. This is particularly the case when the microwave source has just been switched on. This is because the thermal time constant due to the cooking chamber climate is longer than the thermal time constant due to heating by means of the microwaves fed into the cooking chamber by the microwave source. In other words, the temperature of the cooking chamber climate changes differently compared to the heating due to the energy input by microwaves. Therefore, for short time scales, for example a period of ten seconds to forty seconds after the microwave source is switched on, the acquired cooking chamber climate value in the cooking chamber and the acquired gradient of the temperature change are still independent or decoupled from each other, which is why the combination of the two pieces of information when evaluated together entails a correspondingly increased information content, so that the load actually present in the cooking chamber can be determined more accurately.

A further aspect provides that the cooking chamber climate value is an actual value of the cooking chamber climate in the cooking chamber or a historical cooking chamber climate value of the cooking chamber climate in the cooking chamber. The cooking chamber climate value can therefore be a current value of the cooking chamber climate, which has just or shortly before been acquired by means of the corresponding sensor, or a previously acquired cooking chamber climate value, which has been stored in a memory of the cooking device, in particular in a memory of a control and/or evaluation unit of the cooking device. The memory can be accessed during the joint evaluation, so that the stored data can be read out.

In particular, both at least one actual value of the cooking chamber climate and at least one historical cooking chamber climate value are used to determine the temperature change and in particular the gradient of the temperature change. It may also be provided that the gradient of the temperature change is determined exclusively based on historical cooking chamber climate values.

According to a further aspect, the at least one cooking chamber climate value is used to determine a load controller value ("LRW"—"Lastreglerwert"). The load controller value is used to provide control of the microwave source and/or at least one further energy source, wherein the control is load dependent. In particular, an actual value of the cooking chamber climate and a historical cooking chamber climate value are used to determine the load controller value. Typically, the load controller value is calculated from the cooking chamber climate, i.e. the currently present cooking chamber climate, or the past cooking chamber climate, the load controller value estimating the thermal load of the food to be cooked in the cooking chamber.

Compared to the cooking chamber climate value, in particular the load controller value, the temperature detected by the temperature sensor associated with the microwave trap or the microwave absorber is only slightly dependent on the thermal influences, which is why the two pieces of information are uncorrelated. The joint evaluation of the two pieces of information results in an increased information content overall, which can be used accordingly for a more precise estimation of the dielectric load in the cooking chamber.

Furthermore, the at least one cooking chamber climate value and the gradient of the temperature change may be plotted against each other to obtain a two-dimensional point which is evaluated in the joint evaluation to estimate the load in the cooking chamber of the cooking device. In other words, a convenient combination of the obtained information takes place to be able to make an estimation of the load present in the cooking chamber therefrom.

The cooking chamber climate value and the gradient of the temperature change can be considered for a defined period of time, for example for 120 seconds, in particular starting after a predefined buffer time, for example a buffer time of 6, 10 or 15 seconds after switching on the microwave source of the cooking device.

The joint evaluation of the cooking chamber climate value and the gradient can be performed for a period of time of 10 seconds to 40 seconds, in particular for a period of time between 15 seconds and 30 seconds. This time period ensures that the information obtained, i.e. the at least one cooking chamber climate value and the gradient of the temperature change, is still decorrelated.

During the joint evaluation, a feature space is thus spanned which comprises at least two dimensions associated with the cooking chamber climate value and the gradient of the temperature change. As explained above, another variable can be derived via the cooking chamber climate value, for example the load controller value. In this respect, the two-dimensional feature space can also be formed from the load controller value, which has been obtained via the cooking chamber climate value, and the gradient of the temperature change, in particular a value derived therefrom.

The two-dimensional feature space may be correspondingly divided or subdivided into areas by means of which a classification or grouping is possible to estimate, in particular classify, the load present in the cooking chamber of the cooking device, i.e. to assign it to a corresponding class.

A further aspect provides that the at least one cooking chamber climate value and the gradient of the temperature change are evaluated in a weighted manner during the joint evaluation. For this purpose, weighting factors may be provided which are used and applied accordingly in the joint evaluation of the different information. The weighting factors are in particular specific to the type of food to be cooked. In this respect, the weighting factors depend on the respective type of food to be cooked of the food to be cooked introduced into the cooking chamber. Depending on the type of food to be cooked introduced in the cooking chamber, different weighting factors are therefore used for the two pieces of information during the joint evaluation, i.e. for the cooking chamber climate value and the gradient of the temperature change.

The type of food to be cooked can be entered manually or can be previously determined automatically. In particular, the type of food to be cooked is also recognized via a correspondingly set cooking program, provided that the cooking program is typical for the food to be cooked. For example, in the case of the "roast chicken" cooking program, it can be concluded that the food to be cooked is "poultry".

Basically, the cooking chamber climate value and the gradient of the temperature change are individual predictions for the load present in the cooking chamber, which are combined with each other to be able to provide an accurate estimate of the load in the cooking chamber of the cooking device. In the individual predictions, it is possible to infer the dielectric load in the case of the determined gradient of the temperature change and the thermal load detected by the sensor. By means of the weighting factors, the corresponding individual predictions are weighted to be able to make a correspondingly accurate estimation. The values for the weighting factors may have been previously determined by means of empirical data for different types of food to be cooked and stored so that they can be retrieved.

In particular, an artificial intelligence is provided which performs the joint evaluation. The artificial intelligence may have been trained previously by means of at least one data set comprising cooking chamber climate values, gradients and defined loads, so that the artificial intelligence can make a corresponding assignment of cooking chamber climate values and gradients to a corresponding load. During training, feedback can then be provided by determining and feeding back a deviation from the load predicted by the artificial intelligence with the actual load stored in the data set. The artificial intelligence is thus trained accordingly.

The artificial intelligence may be a machine learning model which has been trained accordingly.

In particular, the artificial intelligence has been pre-trained to select weighting factors for the gradient of the temperature change and the at least one cooking chamber climate value during the joint evaluation.

For this purpose, the artificial intelligence may have been trained accordingly with a training data set, in which (in addition) information about a type of food to be cooked, a weighting factor for the gradient of the temperature change, a weighting factor for the at least one cooking chamber climate value were contained.

Furthermore, it may be provided that during the joint evaluation of the at least one cooking chamber climate value and the gradient of the temperature change, at least one future value for the cooking chamber climate and/or the gradient of the temperature change is predicted. In this respect, it is possible to predict the future course of the previously acquired information. This can also be done by means of the artificial intelligence, in particular an artificial intelligence designed as a neural network. For example, a recurrent neural network (RNN) is used, which has been appropriately trained to be able to make predictions.

Basically, for the functionality of the prediction, a correspondingly large amount of data has previously been provided to the artificial intelligence, in particular to the recurrent neural network, during the training of the artificial intelligence, as a result of which the latter(s) has/have been trained to be able to make corresponding predictions or forecasts.

In particular, the microwave trap or the microwave absorber and the temperature sensor associated with the microwave trap or the microwave absorber are both integrated into a core temperature probe. The core temperature probe typically has a microwave trap which prevents microwaves introduced into the cooking chamber from exiting the cooking chamber via the core temperature probe and the cable connected thereto and/or from interfering with the electronics of the cooking device. The temperature sensor is associated with the microwave trap so that the temperature of the microwave trap can be sensed. It may also be provided that the core temperature probe includes a microwave absorber having the corresponding associated temperature sensor.

Alternatively, the microwave trap and the associated temperature sensor or the microwave absorber and the temperature sensor associated with the microwave absorber are provided separately in the cooking chamber, namely as part of a separate assembly. The latter may be separately arranged on a wall of the cooking chamber to estimate the dielectric load.

Furthermore, the object is achieved by a cooking device for cooking food to be cooked. The cooking device comprises a cooking chamber, a microwave source associated with the cooking chamber, at least one climate sensor for detecting a cooking chamber climate value in the cooking chamber, and at least one temperature sensor associated with a microwave trap or a microwave absorber. The cooking device also comprises an evaluation unit which is connected to the at least one climate sensor and the at least one temperature sensor associated with the microwave trap or the microwave absorber in a signal-transmitting manner. The evaluation unit is arranged to jointly evaluate a cooking chamber climate value detected by the climate sensor and a temperature value detected by the temperature sensor associated with the microwave trap or the microwave absorber by determining the gradient of a temperature change, which is evaluated together with the cooking chamber climate value to estimate a load in the cooking chamber of the cooking device. In this respect, the cooking device is arranged to perform the aforementioned method. With regard to the features and advantages of the cooking device, reference is made to the previous explanations.

BRIEF DESCRIPTION OF THE DRAWINGS

Further advantages and features of the claimed subject matter will become apparent from the description below and the drawings, to which reference is made and in which:

DETAILED DESCRIPTION

Figure 1:
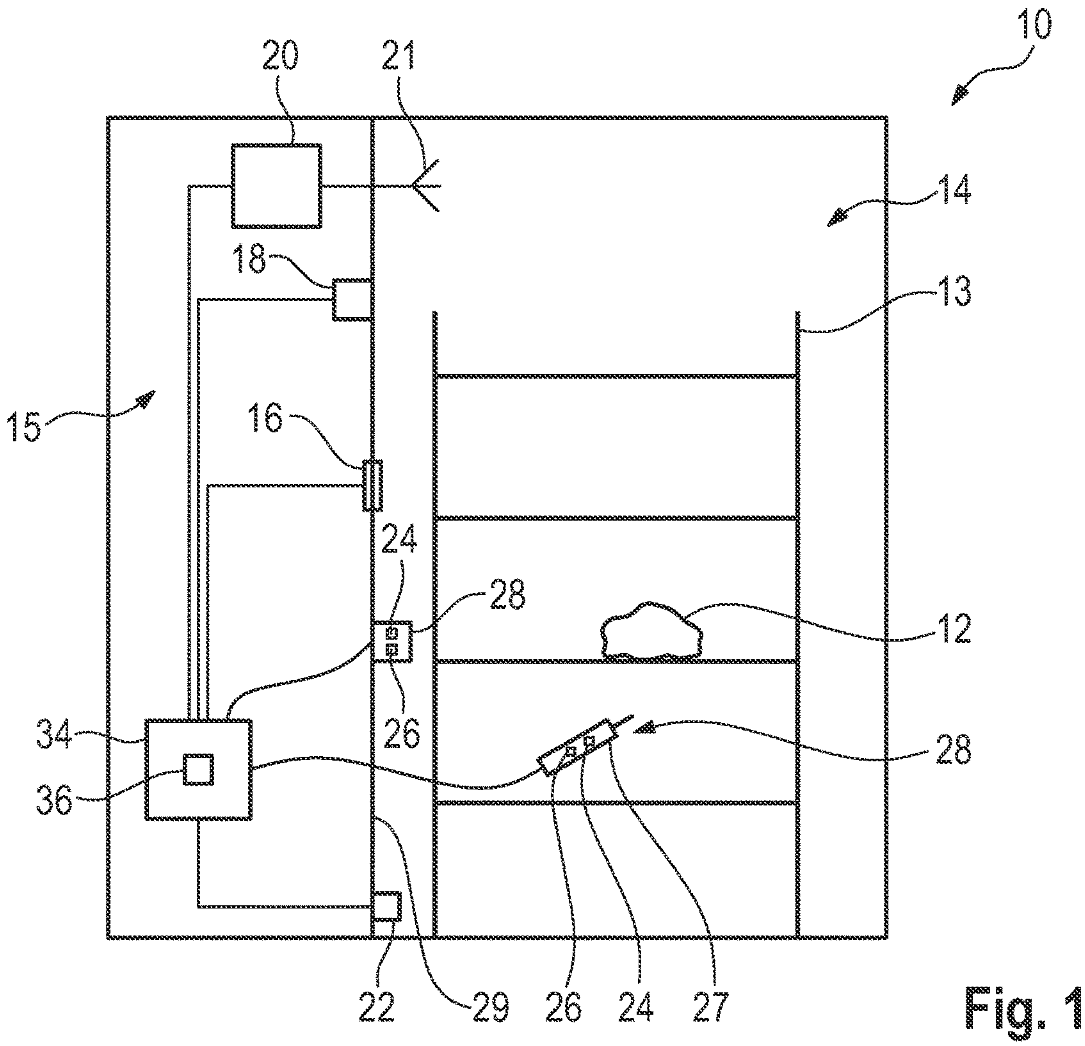
FIG. 1 shows a schematic representation of a cooking device according to an embodiment of the present disclosure.

FIG. 1 shows a cooking device 10 for cooking food to be cooked 12 that has been placed on a rack 13 in a cooking chamber 14 of the cooking device 10 to be cooked there. The rack has a plurality of levels, wherein at least one food item to be cooked 12 may be provided on each of the plurality of levels. In particular, the cooking device 10 or the cooking chamber 14 may be loaded differently, that is, loaded with different amounts of food to be cooked 12, for example distributed among the different levels of the rack 13.

The cooking chamber 14 is separated from an installation chamber 15, which, among other things, at least partially accommodates the components that serve to set a cooking atmosphere in the cooking chamber 14 or provide the energy for cooking the food to be cooked 12.

In the embodiment shown, the cooking device 10 includes a heating device 16, a steam device 18, and a microwave source 20 associated with the cooking chamber 14, by means of which microwaves can be generated and fed into the cooking chamber 14 to (additionally) apply energy to the food to be cooked 12. For this purpose, at least one antenna 21 may be assigned to the microwave source 20, which faces the cooking chamber 14 to feed the electromagnetic waves (microwaves) provided by the microwave source 20, for example a semiconductor component or a magnetron, into the cooking chamber 14.

The heating device 16 and/or the steam device 18 can be used to generate the cooking atmosphere in the cooking chamber 14, which is also referred to as cooking chamber climate, i.e. a defined temperature and/or a defined humidity to which the food to be cooked 12 is exposed during cooking.

Alternatively or additionally, an infrared source which serves as a heating device 16 may also be provided.

In addition, the cooking device 10 comprises at least one climate sensor 22, which may be configured, for example, as a humidity sensor and/or temperature sensor, the climate sensor 22 detecting a cooking chamber climate value in the cooking chamber 14, i.e. the temperature in the cooking chamber 14 and/or the humidity in the cooking chamber 14.

Furthermore, the cooking device 10 comprises a microwave trap 24 in which the microwaves that have been emitted by the microwave source 20 and reflected can be at least partially absorbed, as a result of which the microwave trap 24 heats up.

Alternatively or in addition to the microwave trap 24, a microwave absorber may also be provided which absorbs microwaves fed into the cooking chamber 14 by the microwave source 20, as a result of which the microwave absorber heats up.

A temperature sensor 26 which detects the corresponding temperature change of the microwave trap 24 or the microwave absorber, respectively, is associated with the microwave trap 24 or the microwave absorber allowing an estimation of the load introduced into the cooking chamber 14, i.e., the amount of food to be cooked 12.

The microwave trap 24 and the associated temperature sensor 26 are for example integrated into a core temperature probe 27. Similarly, the microwave absorber and the associated temperature sensor may be integrated into the core temperature probe 27.

In either case, the microwave trap 24 and the associated temperature sensor 26 or the microwave absorber and the associated temperature sensor 26 together constitute a load sensor assembly 28.

Alternatively to the core temperature probe 27, the load sensor assembly 28 can also be formed separately and placed in the cooking chamber 14, for example arranged on a cooking chamber wall 29 of the cooking chamber 14.

FIG. 1 shows both options of the load sensor assembly 28 accordingly.

In particular, it may also be provided that a microwave trap 24 with an associated temperature sensor 26 and a microwave absorber with an associated temperature sensor 26, i.e. two different load sensor assemblies 28 are provided.

In the following, the preferred example embodiment will be discussed in more detail, in which a microwave trap 24 is provided, as it has a higher accuracy and thus a higher resolution than a microwave absorber.

Figure 2:
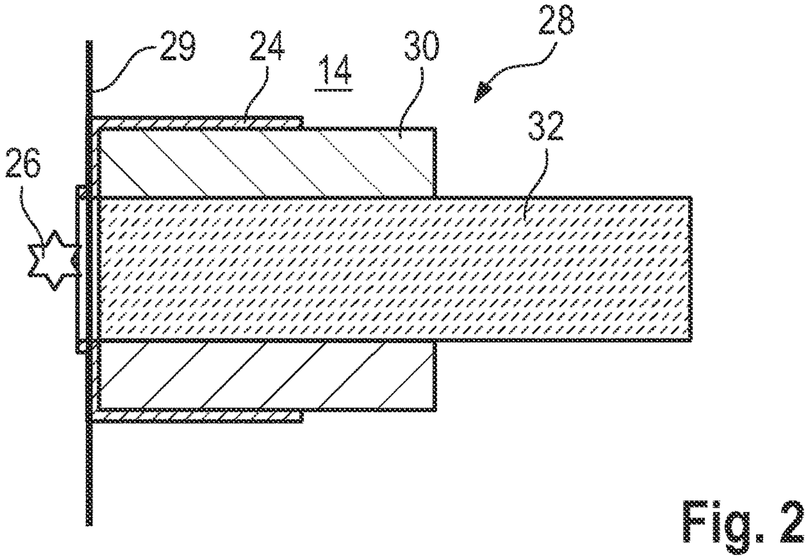
FIG. 2 shows a schematic representation of a load sensor assembly.

The separately formed load sensor assembly 28 is also shown in detail in FIG. 2. The latter shows that the load sensor assembly 28 also has, in addition to a dielectric 30, a separately formed antenna 32 to (better) receive the electromagnetic waves from the cooking chamber 14, i.e. the microwaves emitted by the microwave source 20.

In the embodiment shown, the temperature sensor 26 is provided on an opposite side of the corresponding cooking chamber wall 29, for example within the installation space 15. It is thus ensured that the electromagnetic waves cannot reach the temperature sensor 26, as the latter is electromagnetically shielded by the cooking chamber wall 29. Alternatively, the temperature sensor 26 can also be arranged on the same side of the cooking chamber wall 29 as the microwave trap 24, as indicated in FIG. 1. In that case, it must be ensured by other means that the electromagnetic waves do not influence the temperature sensor 26.

In an alternative configuration, the separately formed load sensor assembly 28 can also be formed without an antenna 32, the dielectric 30 arranged within the microwave trap 24 also functioning as an antenna.

Basically, the microwave trap 24 has an open side via which the microwaves can enter the microwave trap 24. In addition, the microwave trap 24 has a side opposite to the open side, which is also referred to as the bottom of the microwave trap 24.

The dielectric 30 which has been inserted into the microwave trap 24, for example, via the open side is provided within the microwave trap 24.

The dielectric 30 shortens the geometric length of the microwave trap 24 while maintaining the electrical length of the microwave trap 24. Focusing effects improve the effectiveness of the microwave trap 24.

The dielectric 30 may be formed of a ceramic, for example an oxide ceramic such as alumina ($Al_2O_3$), or polytetrafluoroethylene (PTFE).

Provided that the field strength or the energy density in the microwave trap 24 is already very high, the dielectric 30 may be formed by the antenna 32 or another component.

Silicon carbide (SSiC) may also be provided to increase the microwave losses in the microwave trap 24 if the field strength or losses of $Al_2O_3$ or PTFE are not sufficient to achieve a sufficient temperature swing. SSiC absorbs the microwaves much more strongly compared to $Al_2O_3$ and PTFE.

If the load sensor assembly 28 is implemented by the core temperature probe 27, the latter may include a piercing section for piercing the food to be cooked 12, and a grip section through which the core temperature probe 27 may be or is intended to be grasped by a user.

The piercing section is formed of, for example, a thermally conductive material (material having a high thermal conductivity), in particular a metal, whereas the grip section may be made of a plastic or a material having a low thermal conductivity, for example a heat-resistant plastic such as a polyetheretherketone (PEEK).

A core temperature sensor is associated with the piercing section, via which the core temperature of the food to be cooked 12 can be measured when the core temperature probe 27 has been inserted into the food to be cooked 12 via the piercing section thereof.

The load sensor assembly 28, i.e. the microwave trap 24 and the associated temperature sensor 26, is furthermore provided in the core temperature probe 27. For example, the microwave trap 24 and the temperature sensor 26 are both arranged in the grip section of the core temperature probe 27 so that they are accommodated in a protected manner.

Thus, as shown in FIG. 1, the load sensor assembly 28 may be integrated into the core temperature probe 27 or formed separately from the core temperature probe 27.

In any case, regardless of its specific configuration, the load sensor assembly 28 includes, in addition to the temperature sensor 26, the microwave trap 24 in which the dielectric 30 is arranged.

The microwave trap 24 is formed of an electrically conductive material, such as a metal. In this respect, the microwave trap 24 may also be formed of a material having a high thermal conductivity.

Generally, the microwave trap 24 of the load sensor assembly 28 ensures that electromagnetic waves coupled in oscillate in resonance with the structure, thereby forming field rises.

In principle, the load sensor assembly 28 ensures that a dielectric load in the cooking chamber 14, for example the food to be cooked 12 or a cooking accessory, can be determined easily and quickly. However, an empty cooking chamber 14 can also be clearly detected. For this purpose, the temperature of the microwave trap 24 is detected by means of the associated temperature sensor 26.

This is possible because a corresponding electric field is formed as a function of the dielectric load present in the cooking chamber 14.

The electric field present in the cooking chamber 14 ensures that an electric field is also formed in the load sensor assembly 28, in particular the microwave trap 24, which is proportional to the electric field in the cooking chamber 14.

Consequently, the electric field of the load sensor assembly 28 depends on the dielectric load present in the cooking chamber 14.

As a function of the electric field in the load sensor assembly 28, particularly in the microwave trap 24, ohmic losses and dielectric losses proportional thereto occur in the microwave trap 24, which in turn generate heat loss. This heat loss results in a temperature change of the microwave trap 24, which is detected by the temperature sensor 26. Therefore, the temperature of the microwave trap 24 detected by the temperature sensor 26 can be used to indirectly infer the dielectric load present in the cooking chamber 14.

Furthermore, the cooking device 10 includes an evaluation unit 34 which is connected in a signal-transmitting manner to the climate sensor 22 and at least to the temperature sensor 26 which is associated with the microwave trap 24, in particular to the load sensor assembly 28.

The evaluation unit 34 thus receives the information from the climate sensor 22, i.e. the detected cooking chamber climate value, and the information from the temperature sensor 26, i.e. the detected temperature of the microwave trap 24, which allows conclusions to be drawn about the electric field in the cooking chamber 14 and thus the (dielectric) load in the cooking chamber 14.

The evaluation unit 34 is arranged to detect, among other things, a temperature change of the microwave trap 24 on the basis of the acquired information, in particular to determine the gradient of the temperature change.

Furthermore, the evaluation unit 34 can evaluate the determined gradient of the temperature change together with the cooking chamber climate value to estimate the load in the cooking chamber 14 of the cooking device 10 therefrom. A sensor data fusion thus takes place, as the sensor data of two different sensors are evaluated together, namely that of the climate sensor 22 and that of the temperature sensor 26 associated with the microwave trap 24.

Figure 3A:
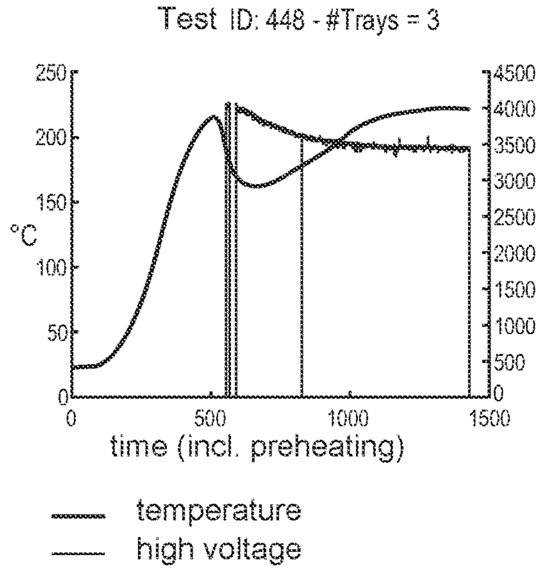
FIG. 3*a* and FIG. 3*b* show diagrams for different loading scenarios, wherein in the diagrams, the temperature detected by the temperature sensor associated with the microwave trap or the microwave absorber and the voltage supply of a microwave source are plotted against time.
Figure 3B:
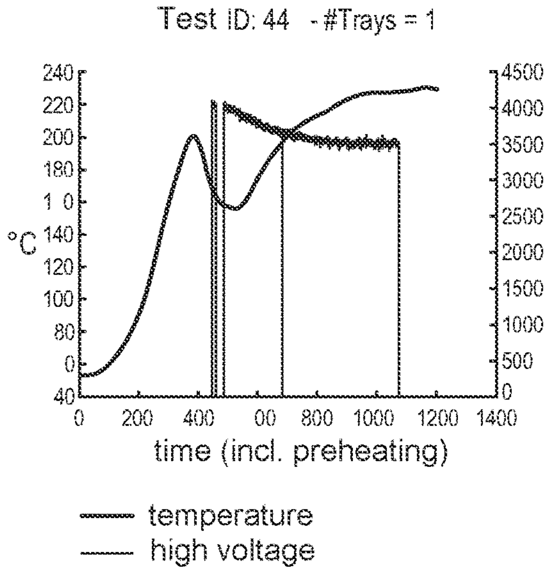

The sensor data fusion is necessary to avoid incorrect estimations with regard to the introduced load, i.e. the charging, which can occur if only the temperature in the cooking chamber 14 is taken into account, as shown in FIGS. 3*a* and 3*b*.

In fact, the cooking chamber 14 there has been loaded with three trays (FIG. 3*a*—#Trays=3) and with one tray (FIG. 3*b*—#Trays=1), thus three levels of the rack 13 and one level of the rack 13, respectively, have been used.

A comparison of the two figures shows that the temperature of the temperature sensor 26 associated with the microwave trap 24 cools down before the microwaves are applied, i.e., before the microwave source 20 is switched on, causing the slope of the temperature to be negative. However, this has the effect that in particular the load is overestimated when only one tray is loaded.

Therefore, it is provided that in addition to the temperature sensor 26 associated with the microwave trap 24, the information of the climate sensor 22 is also taken into account, i.e., the cooking chamber climate of the past ("historical cooking chamber climate values"), of the present ("actual values") and/or the future target climate ("set values"), to make an appropriate load prediction.

In other words, a joint evaluation of the at least one cooking chamber climate value and of the gradient of the temperature change is performed to estimate the load in the cooking chamber 14 of the cooking device 10.

The joint evaluation takes place, for example, in a time period in which the information of the temperature sensor 26 associated with the microwave trap 24 and the information of the cooking chamber climate value are decorrelated, i.e. are still independent of each other, since the temperature sensor 26 has not yet been heated by the temperature in the cooking chamber 14. In particular, the corresponding time period is immediately after the microwave source 20 is switched on, for example in a time period of ten seconds to 40 seconds after the microwave source 20 is switched on.

In particular, a predefined buffer time is first waited for, for example a buffer time of 6, 10 or 15 seconds after the microwave source 20 of the cooking device 10 is switched on.

In principle, however, a longer period of time can be considered, so that the cooking chamber climate value and the gradient of the temperature change are considered for a defined period of time, for example for 120 seconds. It is thus ensured that sufficient information is available, even if only a time period of, for example, ten seconds to 40 seconds after switching on the microwave source 20 is used for the evaluation itself.

The at least one cooking chamber climate value of the climate sensor can be used by the evaluation unit 34 to determine a load controller value (LRW). Typically, an actual cooking chamber climate value and a historical cooking chamber climate value are used for this purpose to determine the load controller value (LRW).

Furthermore, the evaluation unit 34 can use information relating to the cooking program running, for example information relating to the food to be cooked 12. Accordingly, the at least one cooking chamber climate value and the gradient of the temperature change can be evaluated in a weighted manner during the joint evaluation, with weighting factors specific to the type of food to be cooked being used for the two uncorrelated sensor data. This ensures that optimized load prediction is possible, as for poultry, for example, a 70/30 weighting of the two sensor data provides the most accurate prediction, whereas for bread rolls, a 10/90 weighting provides the most accurate prediction.

This is because certain types of food to be cooked may have a low load in the load controller value but can be well estimated via the load sensor assembly 28, whereas other types of food to be cooked can be better mapped by the LRW. This is taken into account accordingly via the weighting factors specific to the type of food to be cooked.

In principle, the evaluation unit 34 is configured to evaluate both pieces of information together, i.e. that of the cooking chamber climate value and the temperature of the microwave trap 24 detected by the temperature sensor 26, such that a two-dimensional feature space is formed, in which a classification or grouping is carried out to estimate the corresponding load in the cooking chamber 14.

Figure 4:
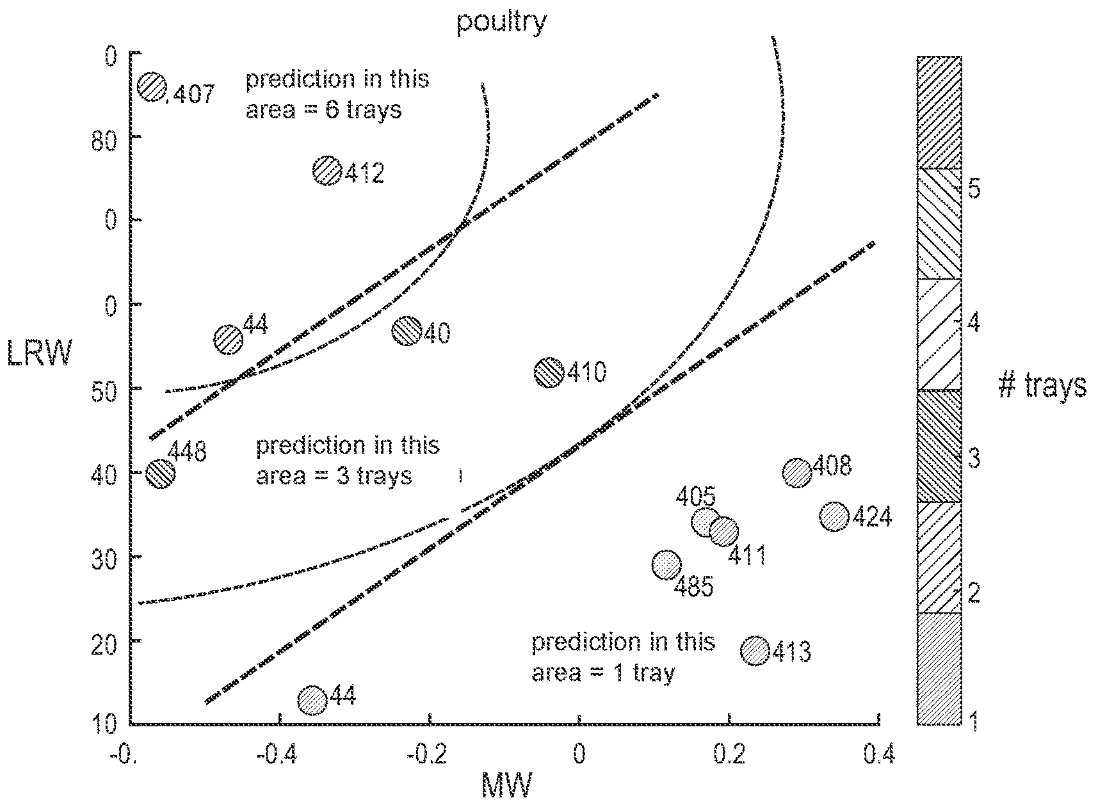
FIG. 4 shows a representation of a two-dimensional feature space for estimating the load present in the cooking chamber.

An exemplary two-dimensional feature space is shown in FIG. 4, in which based on the cooking chamber climate value, the load controller value (LRW) has been previously determined, which is one feature of the two-dimensional feature space. The other feature of the two-dimensional feature space corresponds to the gradient of the temperature change of the temperature sensor 26 associated with the microwave trap 24, which has been abbreviated as iMW in FIG. 4.

In FIG. 4, corresponding classifications or groupings are shown by means of dashed lines, by means of which a differentiation of the load introduced into the cooking chamber 14 is possible in a correspondingly automated manner via the evaluation unit 34.

FIG. 4 shows the two-dimensional feature space for the food to be cooked 12 "poultry", so that the weighting factors specific to the type of food to be cooked have been taken into account for this type of food to be cooked to make the feature space correspondingly meaningful, i.e. to enable defined decision limits. These can be formed within the two-dimensional feature space by straight lines or by curves, as can be seen in FIG. 4.

The two-dimensional feature space comprises several test series, which also have outliers. Ideally, the individual load groups, i.e. 1, 2, . . . or 6 trays, would namely group ("cluster") in this 2D feature space consisting of LRW and iMW. However, tests 446, 448 and 449 are "outliers".

However, tests 446 and 448 only constitute outliers with respect to the feature iMW, i.e., the slope of the temperature of the temperature sensor 26 associated with the microwave trap 24 after insertion of the microwave source 20, but not with respect to LRW.

It should be noted here that the larger the slope of the temperature, i.e. the larger the iMW, the smaller the (dielectric) load. However, for the feature LRW, it can be said that the greater the LRW, the greater the (thermal) load.

Test 449 was correctly estimated with respect to the feature iMW, since the value of iMW, "−0.38", is similar to the values of tests 407 and 412, which also represent a load of six trays. However, the value of LRW (~55) for test 449 is more in the range of a loading of three trays, even though test 449 includes a loading of six trays.

However, the decision limits are appropriately present to make a correct prediction.

In principle, the evaluation unit 34 may also comprise an artificial intelligence 36, for example a machine learning model or a neural network, in particular a recurrent neural network, i.e. a feedback neural network.

Accordingly, the artificial intelligence 36 may have been previously trained to automatically determine correlations of the received information and to make appropriate evaluations or predictions. In this respect, at least one future value for the cooking chamber climate and/or the gradient of the temperature change may be predicted.

Thus, the artificial intelligence 36 can determine a current climate trace based on the current cooking chamber climate and the past climate to predict the future course based on the current climate trace. For example, the future profile of the temperature of the temperature sensor 26 associated with the microwave trap 24 can be predicted, particularly without the microwave source 20 being switched on. It is thus possible to compare the actual temperature profile, influenced by the microwave source 20, with the prediction and to generate information from the difference.

In other words, with the artificial intelligence 36, it is then possible to estimate a load using only the cooking climate prediction. The microwaves generated by the microwave source 20 are then used again to specifically provoke a change in the temperature sensor 15 associated with the microwave trap 24, so that better prediction results can be obtained.

The invention claimed is:

1. A method for load detection in a cooking chamber of a cooking device, the method comprising the following steps:
- acquiring at least one cooking chamber climate value in the cooking chamber;
- acquiring a gradient of a temperature change using a temperature sensor associated with a microwave trap or a microwave absorber; and
- jointly evaluating the at least one cooking chamber climate value and the gradient of the temperature change to estimate the load in the cooking chamber of the cooking device,
- wherein an artificial intelligence is provided which performs the joint evaluation or wherein at least one future value for the cooking chamber climate and/or the gradient of the temperature change is predicted during the joint evaluation of the at least one cooking chamber climate value and the gradient of the temperature change or wherein the microwave trap or the microwave absorber and the temperature sensor associated with the microwave trap or the microwave absorber are both integrated in a core temperature probe.

2. The method according to claim 1, wherein the joint evaluation takes place in a time period in which the information of the temperature sensor associated with the microwave trap or the microwave absorber and the information of the cooking chamber climate value are decorrelated.

3. The method according to claim 1, wherein the cooking chamber climate value is an actual value of the cooking chamber climate in the cooking chamber.

4. The method according to claim 1, wherein the cooking chamber climate value is a historical cooking chamber climate value of the cooking chamber climate in the cooking chamber.

5. The method according to claim 1, wherein the at least one cooking chamber climate value is used to determine a load controller value.

6. The method according to claim 5, wherein an actual cooking chamber climate value and a historical cooking chamber climate value are used to determine the load controller value.

7. The method according to claim 1, wherein the at least one cooking chamber climate value and the gradient of the temperature change are plotted against each other to obtain a two-dimensional point which is evaluated in the joint evaluation to estimate the load in the cooking chamber of the cooking device.

8. The method according to claim 1, wherein the at least one cooking chamber climate value and the gradient of the temperature change are evaluated in a weighted manner during the joint evaluation.

9. The method according to claim 8, wherein weighting factors specific to the type of food to be cooked are provided.

10. The method according to claim 1, wherein the artificial intelligence has been trained in advance to select weighting factors for the gradient of the temperature change and the at least one cooking chamber climate value.

11. A cooking device for cooking food to be cooked, wherein the cooking device comprises a cooking chamber, a microwave source associated with the cooking chamber, and at least one temperature sensor associated with a microwave trap or a microwave absorber, wherein the cooking device comprises a heating device and a steam device which are configured to generate a cooking chamber climate in the cooking chamber, wherein the cooking chamber climate has at least one of a defined temperature or a defined humidity to which the food to be cooked is exposed during cooking, wherein the cooking device also comprises at least one climate sensor which is configured for acquiring a cooking chamber climate value associated with the cooking chamber climate in the cooking chamber, which is set by at least one of the heating device or the steam device, wherein the cooking device further comprises an evaluation unit which is connected to the at least one climate sensor and the at least one temperature sensor associated with the microwave trap or the microwave absorber in a signal-transmitting manner, and wherein the evaluation unit is configured to jointly evaluate a cooking chamber climate value acquired by the climate sensor and a temperature value acquired by the temperature sensor associated with the microwave trap or the microwave absorber by determining the gradient of a temperature change, which is evaluated jointly with the cooking chamber climate value, to estimate a load in the cooking chamber of the cooking device.

12. A method for load detection in a cooking chamber of a cooking device, the method comprising the following steps:

acquiring at least one cooking chamber climate value in the cooking chamber using a climate sensor, acquiring a gradient of a temperature change using a temperature sensor associated with a microwave trap or a microwave absorber, fusing the at least one cooking chamber climate value and the gradient of the temperature change, which are two different pieces of information obtained via different and independent sensors of the cooking device, thereby providing a sensor data fusion, and jointly evaluating the at least one cooking chamber climate value and the gradient of the temperature change to estimate the load in the cooking chamber of the cooking device since microwaves introduced into the cooking chamber by a microwave source of the cooking device to cause an electro-magnetic field to form in the cooking chamber as a function of the load present in the cooking chamber.

* * * * *